United States Patent [19]
Mayfield

[11] 3,875,832
[45] Apr. 8, 1975

[54] MANUAL PIPE BEVELLING TOOL

[76] Inventor: Johnny W. Mayfield, 4505 Greenstone Rd., Sacramento, Calif. 95667

[22] Filed: July 26, 1973

[21] Appl. No.: 382,771

[52] U.S. Cl. .................... 82/4 C; 144/205
[51] Int. Cl. .................. B23b 3/22; B27f 1/08
[58] Field of Search ............... 82/4 C; 144/205

[56] References Cited
UNITED STATES PATENTS

| 1,099,215 | 6/1914 | Sullivan | 82/4 C |
| 1,823,959 | 9/1931 | Steinmayer | 144/205 |
| 1,972,022 | 8/1934 | LeMay | 82/4 C |
| 2,351,217 | 6/1944 | Kopp | 82/4 C |
| 3,075,412 | 1/1963 | Kushmok et al. | 82/4 C |
| 3,164,062 | 1/1965 | Hogden et al. | 82/4 C |
| 3,202,190 | 8/1965 | Gill | 144/205 |
| 3,229,555 | 1/1966 | Castles, Jr. | 82/4 C |
| 3,421,492 | 1/1969 | Brown | 82/4 C |

Primary Examiner—Harrison L. Hinson
Attorney, Agent, or Firm—Blair & Brown

[57] ABSTRACT

A pipe bevelling tool having a shaft centrally locked in a pipe to be bevelled by means of an internal expanding jaw mandrel. The bevelling cutter is mounted on the shaft for rotation thereon and has a plurality of cutters arranged at the angle of the bevel. A nut is provided for pressing the cutters against the pipe as the cutters are rotated by hand or power. The mandrels can be expanded sufficient to grip pipes of different sizes and can be interchanged to provide for additional sizes.

5 Claims, 8 Drawing Figures

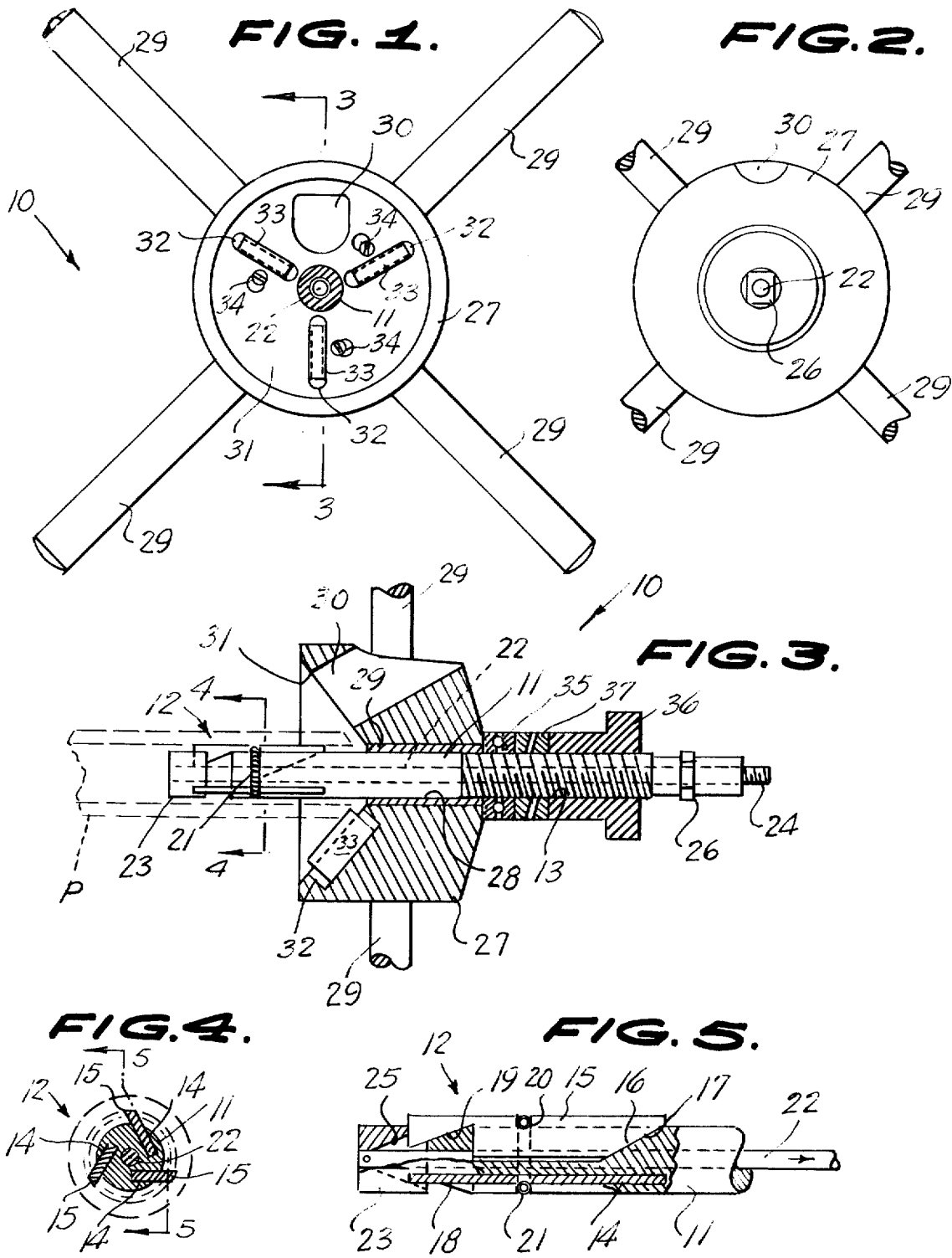

ced pipe bevelling tools.

MANUAL PIPE BEVELLING TOOL

BACKGROUND OF THE INVENTION

1. Field of the Invention

The present invention relates to manually and power actuated pipe bevelling tools.

2. Summary of the Invention

The pipe bevelling tool of the instant invention includes a shaft locked internally and centrally of the pipe to be bevelled with a hand or power actuated cutter mounted for rotation on the shaft and pressed toward the pipe by a nut on the shaft.

The primary object of the invention is to provide a manually or power actuated pipe bevelling tool which can be used on a plurality of pipe sizes.

Other objects and advantages will become apparent in the following specification when considered in light of the attached drawings.

BRIEF DESCRIPTION OF THE DRAWINGS

FIG. 1 is a front elevation of the invention;

FIG. 2 is a rear elevation of the invention;

FIG. 3 is a vertical sectional view, taken along the line 3—3 of FIG. 3, looking in the direction of the arrows;

FIG. 4 is a vertical sectional view, taken along the line 4—4 of FIG. 3, looking in the direction of the arrows;

FIG. 5 is an enlarged side elevational view of the mandrel shown partially broken away and in section for convenience of illustration;

DESCRIPTION OF THE PREFERRED EMBODIMENT

Figure 7:
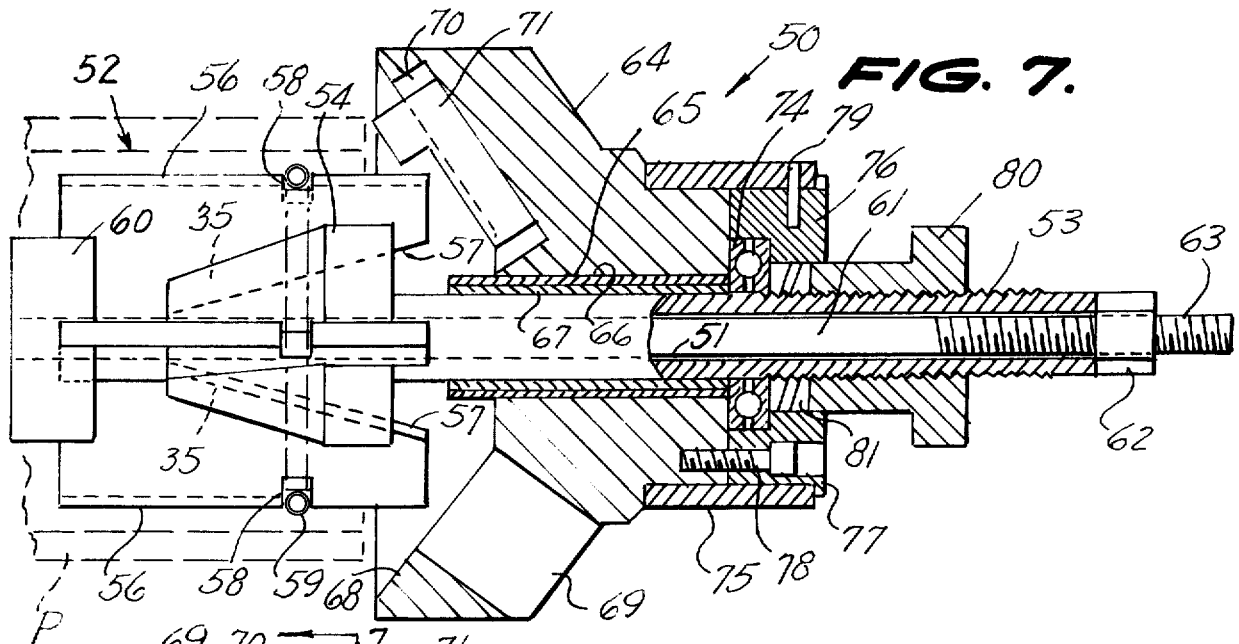
FIG. 7 is a longitudinal sectional view, taken along the line 7—7 of FIG. 6, looking in the direction of the arrows.

Referring now to the drawings in detail, wherein like reference characters indicate like parts throughout the several figures, the reference numeral 10 indicates generally a manually actuated pipe bevelling tool constructed in accordance with the invention.

The pipe bevelling tool 10 includes a hollow shaft 11 having a mandrel generally indicated at 12 on one end thereof. The shaft 11 on the end thereof opposite the mandrel 12 is externally threaded at 13.

The mandrel 12 includes a plurality of longitudinally extending slots 14 formed in the shaft 11 to receive a plurality of internal jaw members 15 slidably mounted in the slots 14. The slots 14 have a bevelled end wall 16 on one end which is engaged by a bevelled end wall 17 on the jaws 15. The terminal end of the shaft 11 is bevelled at 18 and is engaged by a sloped portion 19 on the jaw 15. The jaws 15 are each recessed at 20 to receive a retaining spring 21 which extends thereabout.

A rod 22 extends completely through the shaft 11 and has a draw bar and jaw retainer 23 secured to one end thereof with the opposite ends thereof threaded at 24.

The draw bar and jaw retainer 23 is internally tapered at 25 to engage over the tapered end 18 of the shaft 11. Sliding movement of the rod 22 in a direction to move the draw bar and jaw retainer 23 toward the shaft 11 causes the jaw 15 to move longitudinally of the shaft 11 and to ride up the sloping surfaces 16 and 18 so as to expand the jaws 15 outwardly of the shaft 11 so as to tightly engage the inner surface of a pipe P into which they are inserted. A nut 26 is threaded onto the threads 24 of the rod 22 and engages against the end of the shaft 11 to move the rod 22 in a direction to force the jaws 15 outwardly.

A generally circular body 27 has an axial bore 28 extending therethrough and carrying a bearing sleeve 29 therein. The bearing sleeve 29 is adapted to snugly engage the outer surface of the shaft 11 and supports the body 27 for rotation thereon. A plurality of handles 29 are rigidly secured to the body 27 and extend radially outwardly therefrom. An observation port 30 extends angularly through the body 27 to permit observation of the progress of the bevelling operation.

The body 27 has a cone shaped hollow recess 31 opening inwardly from one end thereof and communicating with the bore 28. A plurality of radial slots 32 are formed in the face of the recess 31 in angularly equi-spaced relation as can be clearly seen in FIG. 1. A cutter blade 33 is mounted in each of the slots 32 and is secured therein by a lock screw 34 which extends through the body 27 and engages the cutter 33 within the slot 32.

A thrust bearing 35 is mounted on the shaft 11 in engagement with the body 27. A hand operated nut 36 is threaded onto the threads 13 of the shaft 11 and presses against a thrust washer 37 engaging the thrust bearing 35. The nut 36 can be turned to move the cutters 33 against the end of the pipe P to be bevelled and as the handles 29 are turned to cause the cutter blades 33 to cut the desired bevel on the end of the pipe P continuing pressure can be brought to bear on the body 27 by turning the nut 36.

In the use and operation of the invention the shaft 11 is first inserted into the pipe P and the mandrel 12 is expanded by tightning the nut 26. The body 27 is then placed on the shaft 11 followed by the thrust bearing 35, thrust washer 37 and the nut 36 to bring the cutter 33 against the end of the pipe P to be bevelled. The handle 29 is then used to rotate the body 27 with its cutters 33 and the nut 36 is slowly tightened as the bevelling of the pipe P progresses.

Figure 6:
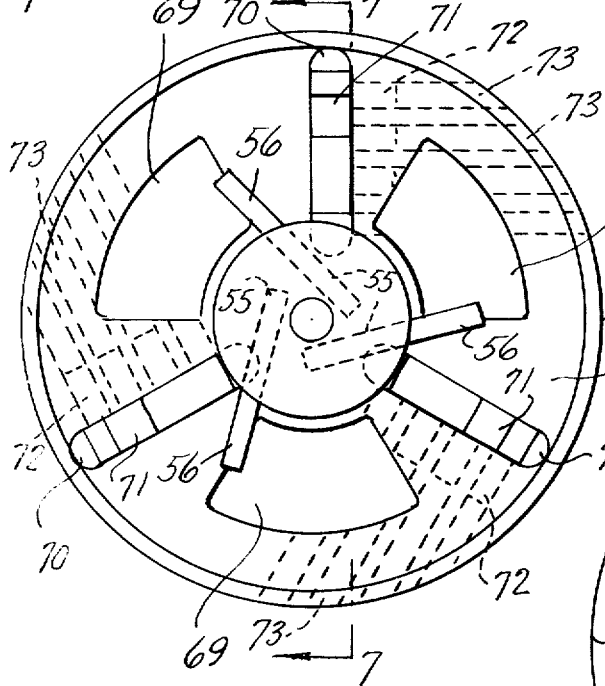
FIG. 6 is an end elevation of a modified form of the invention.
Figure 8:
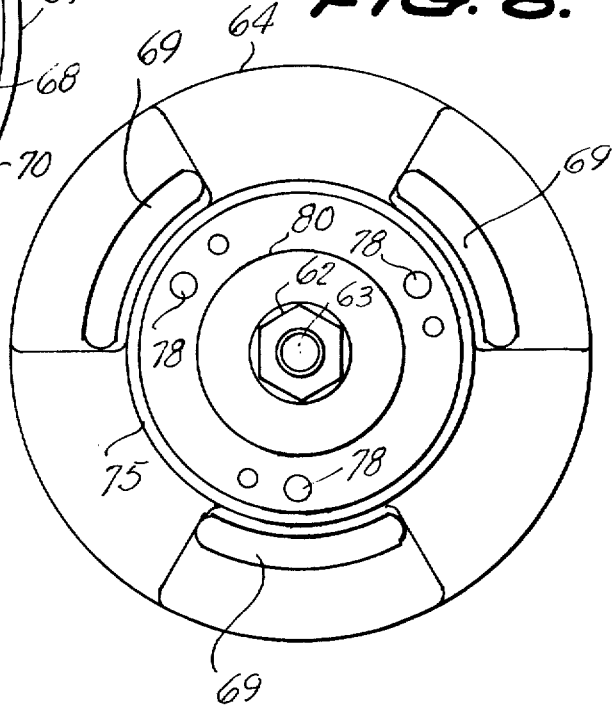
FIG. 8 is an end elevation of the structure illustrated in FIG. 7 taken from the end opposite FIG. 6.

In FIGS. 6 through 8 a modified form of the invention is illustrated generally at 50. The pipe bevelling tool 50 has a hollow shaft 51 with an expanding mandrel generally indicated at 52 on one end thereof. The opposite end of the shaft 51 is externally threaded at 53. The shaft 51 has an enlarged tapered head 54 integrally secured to the end thereof opposite the thread 53 and forming a part of the mandrel 52. The head 54 has a plurality of slots 55 formed therein to receive an expanding jaw 56 in equi-spaced relation. The jaws 56 have a cam edge 57 which engages the bottom of the slot 55. The jaws 56 are each provided with a recess 58 having a coil spring 59 releasably engaged therein to hold the jaws 56 against the head 54. A draw bar and jaw retainer 60 is mounted on one end of a rod 61 extending through the shaft 51 with the draw bar and jaw retainer 60 engaging each of the jaws 56. A nut 62 is threaded onto threads 63 on the rod 61 to engage against the shaft 51 to move the jaws 56 longitudinally of the shaft 51 so as to expand them into clamping engagement with the inner surface of a pipe P.

A cutting head 64 of generally cylindrical form is provided with an axial bore 65 having a bushing 66 and a bushing sleeve 67 fitted therein.

The cutting head 64 has a conical recess 68 formed on one end thereof coaxial with the bore 65. A plurality of observation ports 69 open through the head 64 to permit observation of the bevelling operation. A plurality of radially extending slots 70 are arranged in equi-spaced relation in the face of the recess 68 and each has a cutter bit 71 secured therein by a plurality of set-screws 72 which extend through bores 73 in the head 64.

A thrust bearing 74 is mounted on the shaft 51 in engagement with the side of the head 64 opposite the recess 68. A drive sleeve 75 of generally cylindrical form is mounted on the head 64 opposite the recess 68 and radially outwardly of the thrust bearing 74. A drive sleeve retainer ring 76 encompasses the thrust bearing 74 and has a flange 77 which engages the outer edge of the drive sleeve 75 to retain the drive sleeve 75 on the head 64. Set-screws 78 extending through the retainer 77 secure the retainer 77 to the head 64. A shear pin 79 extends through the drive sleeve 75 and into the retainer 76 to provide a drive connection therebetween which will shear upon undue stress application. A hand actuated thrust nut 80 is threaded onto the threads 53 to apply pressure to a thrust washer 81 against the thrust bearing 74 to force the head 64 in a bevel cutting direction.

In the use and operation of the invention the mandrel 52 is inserted in a pipe P and the nut 62 is turned to force the jaws 56 outwardly into tight engagement with the inner surface of the pipe P. The head 64 is then applied to the shaft 51 and the nut 80 is tightened until the cutting bits 71 come into engagement with the end of the pipe P. The head 64 is then rotated by means of a conventional power head (not shown) gripping the drive sleeve 75. The nut 80 is tightened slowly to move the head 64 in a direction to cut the desired bevel on the pipe P to complete the operation.

The slots 70 may each have differing cutters 71 if desired with one bit cutting the desired J-Bevel, extended bevel or straight bevel, another bit squaring the end into a land and the third bit counterboring the inside of the pipe P.

Having thus described the preferred embodiments of the invention it should be understood that numerous structural modifications and adaptations may be resorted to without departing from the spirit of the invention.

I claim:

1. A pipe bevelling tool comprising an elongate hollow shaft, an expanding mandrel on one end of said shaft, means extending through said shaft for expanding said mandrel to internally grip the pipe to be beveled, a cutting head journalled for rotation on said shaft and having a cone shaped hollow recess on the end thereof adjacent the pipe to be beveled, a plurality of slots formed in said recess, a cutting blade removeably mounted in each of said slots in said recess, means on said shaft for moving said cutting head in a pipe bevelling direction, a plurality of handles extending radially outwardly on said head for rotating said head with said cutters in engagement with the pipe to be beveled, said mandrel including a plurality of equi-spaced mandrel slots formed in the mandrel end of said shaft with each of said mandrel slots parallel to and spaced from a radius of said shaft, said mandrel slots each having the end thereof closest to the end of said shaft opposite said mandrel sloping outwardly toward the end of said shaft opposite said mandrel, said shaft having a conically shaped end portion at the mandrel end thereof, an internal jaw mounted in each of said mandrel slots for sliding longitudinal and radial movement therein, said jaws each having a beveled end for engaging the outwardly sloping end of said mandrel slot and a sloping portion for engaging the conically shaped portion of said shaft whereby endwise sliding movement of said jaws causes said jaws to move outwardly of said mandrel slots into internal engagement with said pipe, and resilient means securing said jaws in said mandrel slots.

2. A device as claimed in claim 1 wherein the means for expanding said mandrel includes an elongate threaded shaft extending through said hollow shaft, means on the mandrel end of said threaded shaft for engaging said jaws for moving said jaws in said mandrel slots, and a nut threaded on said threaded shaft for moving said threaded shaft.

3. A device as claimed in claim 2 wherein each of said jaws has a recess in the outer edge thereof and said resilient means comprieses a single coil spring extending through each of said recesses.

4. A pipe bevelling tool comprising an elongate hollow shaft, an expanding mandrel on one end of said shaft, means extending through said shaft for expanding said mandrel to internally grip a pipe to be beveled, a cutting head journalled for rotation on said shaft and having a cone shaped hollow recess in the end thereof adjacent the pipe to be beveled, a plurality of slots formed in said recess, a cutting blade removeably mounted in each of said slots in said recess, means on said shaft for moving said cutting head in a pipe bevelling direction, sleeve means for connecting said head to a power drive for rotating said head with said cutters in engagement with the pipe to be beveled, said mandrel including a head mounted on the mandrel end of said means for expanding said mandrel, a plurality of equi-spaced mandrel slots formed in said head with each of said mandrel slots parallel to and spaced from a radius of said head, said mandrel slots each having a bottom wall sloping outwardly toward the end of said shaft opposite said mandrel, a jaw mounted for sliding movement in each of said mandrel slots with each of said jaws having a sloping inner edge engaging said sloping bottom wall, resilient means securing said jaws in said mandrel slots and a jaw retainer member secured to the means for expanding said mandrel and engaging said jaws for moving said jaws in said mandrel slots on movement of said mandrel expanding means, movement of said jaws in said mandrel slots camming said jaws outwardly into internal engagement with said pipe.

5. A device as claimed in claim 4 wherein each of said jaws has a recess in the outer edge thereof and said resilient means comprises a single coil spring extending through each of said recesses.

* * * * *